April 17, 1928.
H. V. SHULER
CORN HUSKING MACHINE
Filed April 25, 1927
1,666,796
5 Sheets-Sheet 3
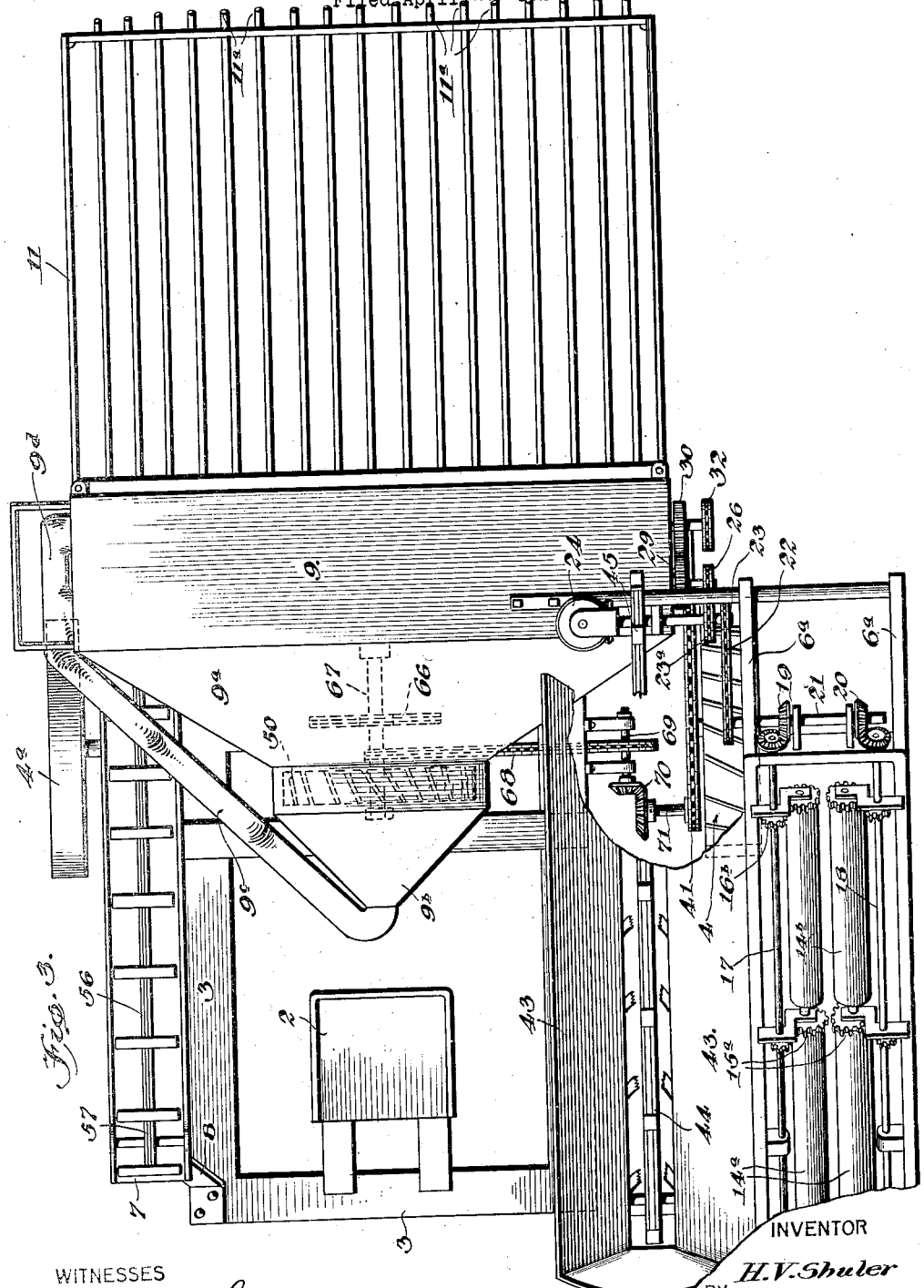

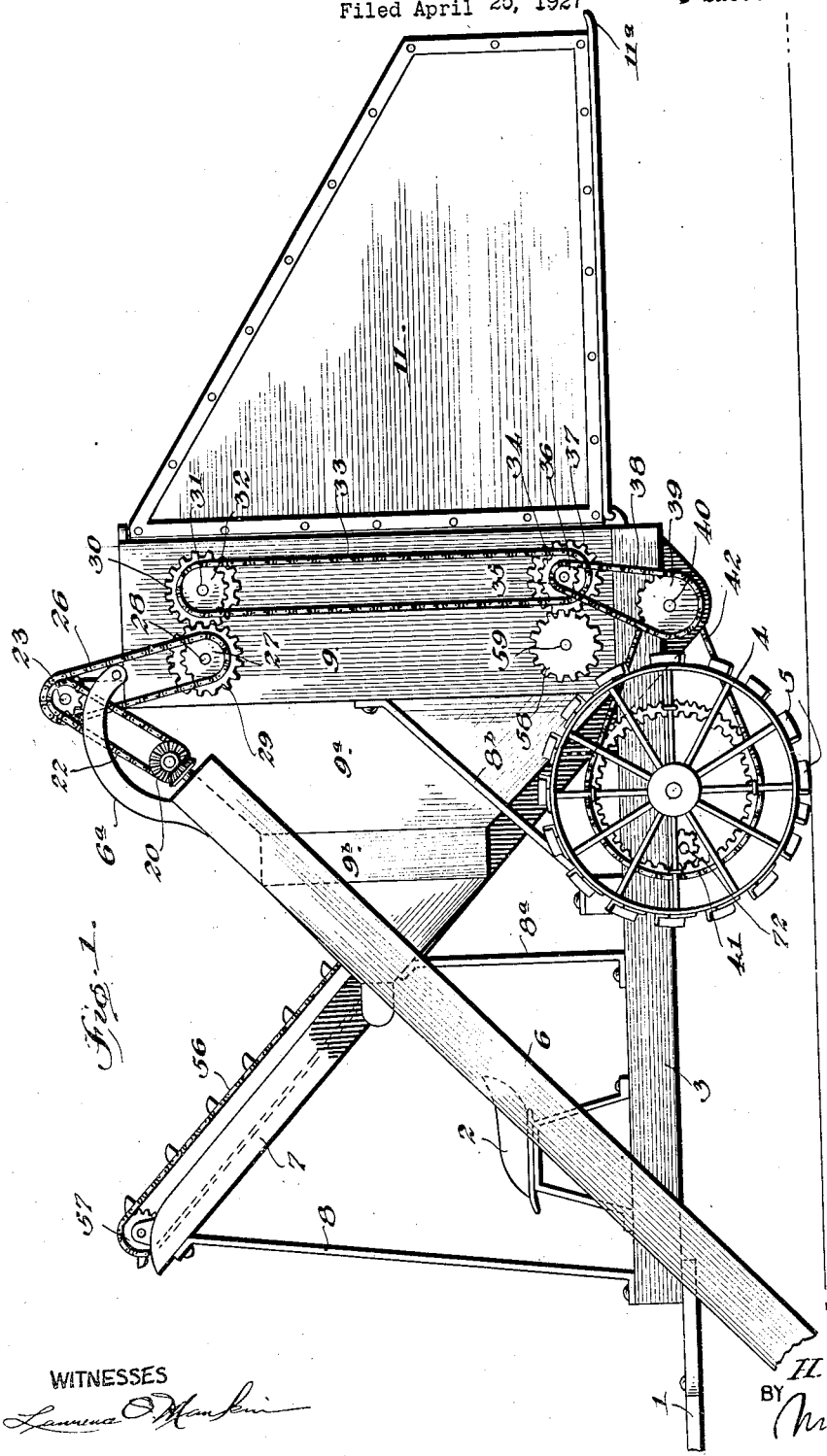

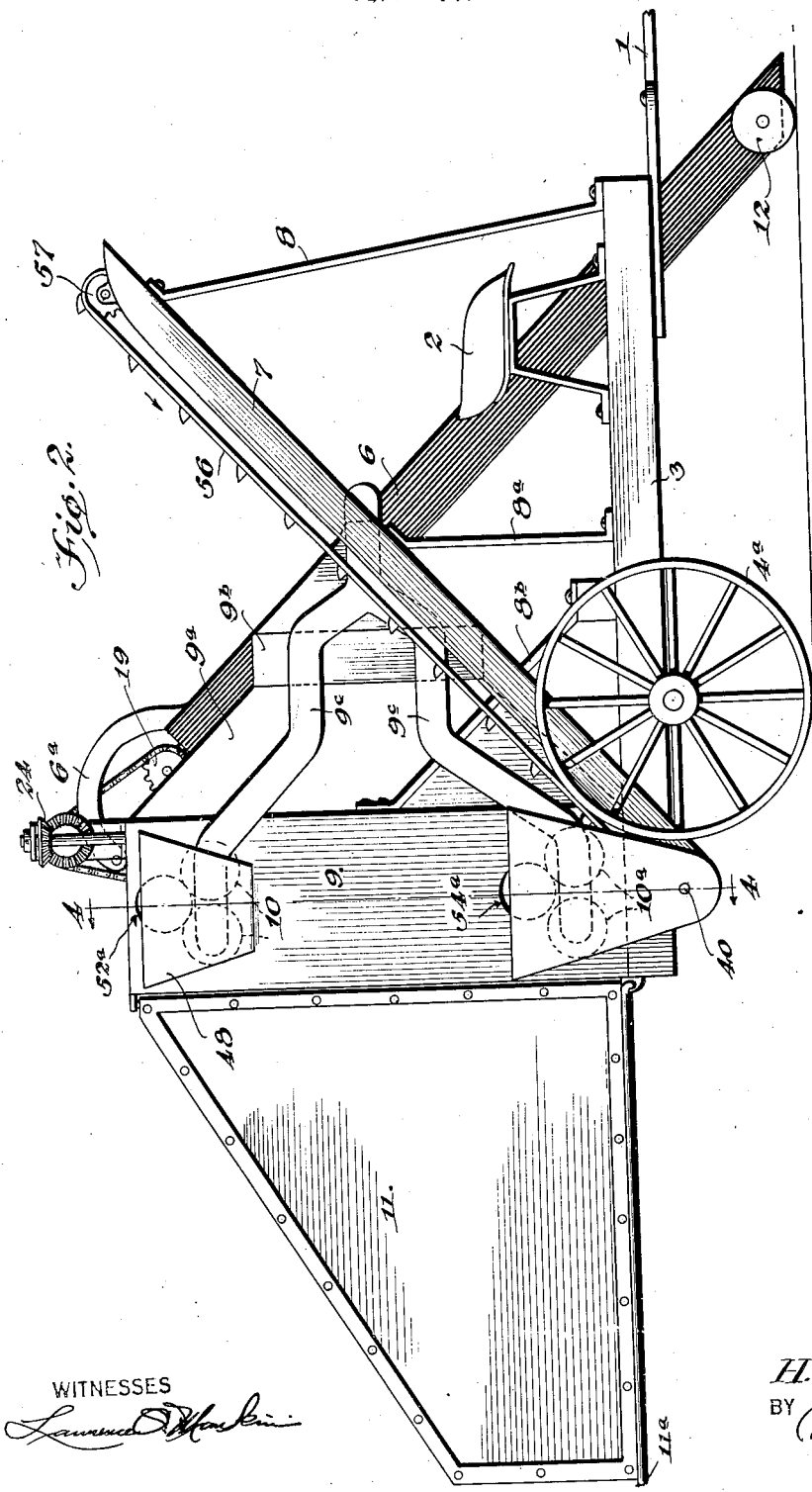

April 17, 1928.
H. V. SHULER
1,666,796
CORN HUSKING MACHINE
Filed April 25, 1927
5 Sheets-Sheet 4
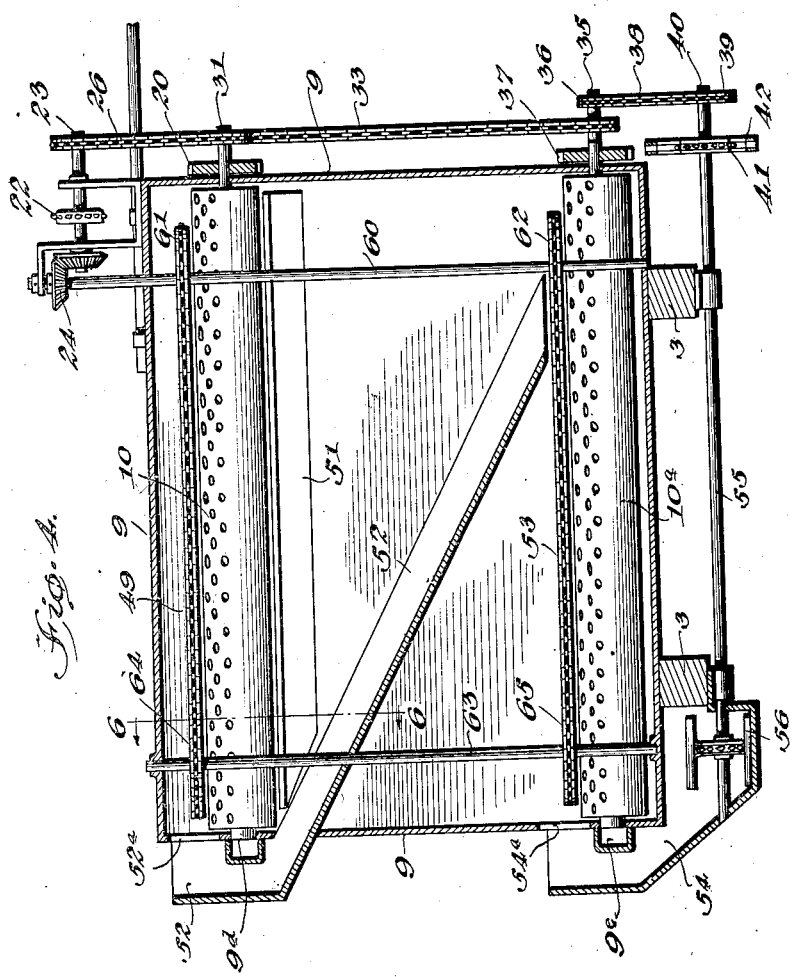
WITNESSES
INVENTOR
H. V. Shuler,
BY
ATTORNEYS

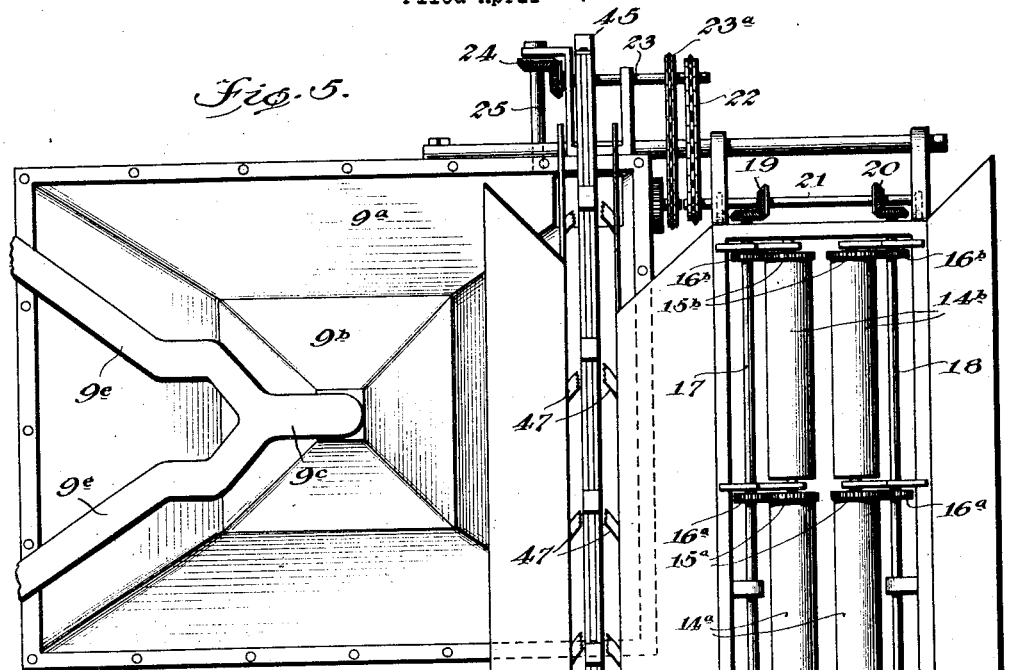
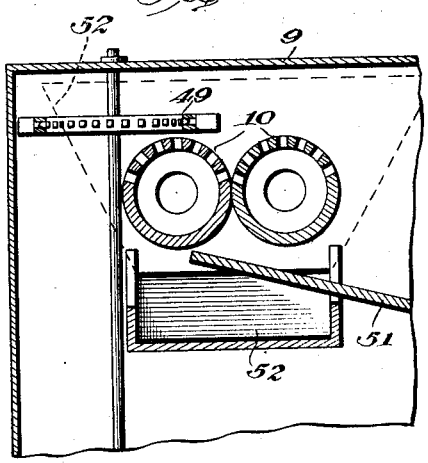

Patented Apr. 17, 1928.

1,666,796

UNITED STATES PATENT OFFICE.

HARRY V. SHULER, OF SPENCER, NEBRASKA.

CORN-HUSKING MACHINE.

Application filed April 25, 1927. Serial No. 186,436.

This invention relates to an improved corn husking machine and has for its object the provision of substantially automatic means for stripping the ears from the stalk, husking them, separating the stripped ears and the husks and dumping each by power means.

The invention resides in the construction and arrangement of parts herein described.

One of the advantages of the machine is that it leaves the stripped stalks standing after the ears have been removed.

Referring now to the drawings,

Figure 1 is a side elevation of the machine showing its left side, the observer looking forward to the traction bar, Fig. 2 shows a side elevation of the right side of the machine, the observer facing in the same direction, Fig. 3 shows a plan view, Fig. 4 is a side elevation on the line 4—4 of Fig. 2, looking forward from the rear of the machine.

Fig. 5 is a front elevation of the stripping and separating gear of the machine, and Fig. 6 is a sectional view on the line 6—6 of Fig. 4, looking toward the right of Fig. 4.

In the accompanying description of the drawings, like parts are denoted by like reference characters.

In Figs. 1 and 2, 1 indicates a draw or traction bar by which the machine may be drawn along a row of corn stalks by a tractor or by horses. 2 is the seat used by the driver when horses are the motive power. 3—3 are members of the frame of the vehicle, these being either steel or wooden beams. 4 and $4^a$ are wheels upon which the vehicle rests, the wheel 4 providing the driving means for the power mechanism of the vehicle by reason of its being turned as the vehicle is drawn along. For this reason, the wheel is preferably provided with cleats 5 around its periphery. 6 is the stripping and primary elevating gear of the machine, shown also in detail at the right hand sides of Figs. 3 and 5. $6^a$ are semi-circular hinge arms swingably attaching the roller support 6 to the top of the vehicle. 7 is the husked corn conveyor. This latter delivers the husked corn to any desired receptacle which may be suspended below its top point. 7 is also shown in plan in Fig. 3.

The outer end of 7 is supported by a strut 8. Both conveyors 6 and 7 operate from within a housing 9 having a reduced portion $9^a$ and a terminal conical portion $9^b$, the portion encloses pairs of rollers 10—$10^a$ shown in detail in Fig. 4, by which the loose husks and ears are separated. The reduced portion serves to connect a fan housing, $9^b$ with 9 so as to enclose the air blast from the fan. An air duct $9^c$ also connects the top and bottom of 9 with $9^b$. Behind the vehicle there is a bin 11 in which the loose husks are temporarily stored until a suitable dumping place can be found. The bin consists merely of walls open at the top but having a floor of slats $11^a$ connected together. Either the floor or rear portion of the bin may be lowered or dropped so as to drop the accumulation of husks from the rear end.

The machine can be described best by referring to its operation and tracing the path of the ears of corn through the machine, which occurs as follows:—

The machine is run along a row of corn so that the stalks come between the jaws $13^a$—$13^a$ of a forefoot provided with small wheels 12—12. The machine is, therefore, able to gather up the low corn because of the swingable attachment of the chute 6, which enables the wheels 12—12 to conform to the configuration of the ground. There is a slot 13 between the jaws into which the stalk is forced by the forward progress of the machine so that it is eventually caught by the upwardly inclined rollers 14, $14^a$ and $14^b$. These rollers are continually revolved inwardly by the progress of the machine (tracing the drive backward) by means of the spur gears 15a, b and c, the spur pinion 16a, b and c, the drive shafts 17 and 18, the bevel gears 19 and 20, the shaft 21, the chain 22, the shaft 23, the bevel gears 24, the shaft 25, the chain 26, the sprocket 27 (see Fig. 1 for the following), the shaft 28 on which 27 is mounted, the spur gear 29, also mounted on 28 and cooperating with spur gear 30 and shaft 31, which also carries the smaller sprocket 32, the chain 33 cooperating therewith to the sprocket 34, carried on shaft 35 upon which are also mounted the smaller driving sprocket 36 and the spur gear 37. The shaft 35 is driven by means of a chain 38 from a sprocket 39 mounted on a jackshaft 40, fast to the vehicle frame. Power is transmitted to the jackshaft from the vehicle wheel 4 through a combined internal gear and external sprocket 41 carried on the wheel, and a chain 42.

After the ears of corn have been stripped off the stalk, the accumulation of them on the rollers 14ª, b and c causes the ears to fall into the trough 43 at the left side of the rollers in which the conveyor chain 44 runs upward. (See Figs. 3 and 5). The chain is operated from the shaft 23 by means of sprocket 45 and is connected also to countershaft 46 by means of sprocket 47.

In the progress of the ear of corn up the conveyor it is brought into contact with a series of fingers 47, which are provided with jagged teeth on their extremities. The fingers are made of spring steel and are so spaced apart as to be a little closer together than the average ear of corn is wide. Adjusting means for this dimension may be provided, so that the extent of the husking action can be regulated. The teeth strip the husks off the ears as these are propelled past the fingers by the conveyor. The stripping conveyor is driven by chain and sprocket 23ª from countershaft 23. Both the husks and stripped ears are carried along to the top of the conveyor from where they tumble down into the trough 48 and on the top of the pair of revolving rollers 10 at a point close to the right end (as seen in Fig. 4) of the rollers. Above the trough formed by the rollers, a chain 49 operates, one end of it, that traveling to the left, being directly over the trough. The function and effect of this chain is to drag the ears across the rollers. The direction of rotation of the rollers is such that the husks which fall between them are caught and carried through. The rollers are provided with a multiplicity of perforations throughout their surface. Through these perforations a suction is created by the fan 50 (see Fig. 3) which communicates with the roller by means of the duct 9ᶜ. The suction assists the rollers to grasp the corn husks, but is not so great as to cause the husks to adhere after the roller junction has been passed.

There is a baffle plate 51 below the rollers 10, which baffle slopes toward the husk bin 11. Husks falling up on the baffle naturally gravitate to the bin. The ears themselves are dragged along the rollers 10 by the chain 49 without being caught by the rollers. They eventually reach the right side of the rollers and drop over the roller ends and through the hole 52ª into the trough 52 which is steeply inclined (see Fig. 4), and leads to the right end of a second pair of rolls, 10ª, similar to the first pair 10. Above these also, a chain 53 operates in the same manner as chain 49. The second pair of rolls 10, act merely as auxiliaries to the first pair. The husks passing through 10 are dumped upon the ground continuously by reason of an opening in the vehicle floor. The ears, however, after traveling along 10ª pass through the hole 54ª in the housing and into the conveyor trough 54. In the bottom part of 54 the shaft 55 operates a bucket conveyor 56, shown associated with trough 7 in Figs. 1 and 2. The ears are scooped up by the buckets and carried along the bottom of trough 7 until the highest and open point of that member is reached, where there is a conveyor sprocket 57 at which it will be seen that the ears are dumped. Any suitable container may be hung from the dumping point on 7 to receive the ears.

The drive for the rollers 10 and 10ª will now be traced. Rollers 10 are carried by and are driven primarily by shafts 28 and 31. 31 is driven by the chain 33 to sprocket 32 to spur gear 30, which meshes with the spur gear 29.

The chain 33 also meshes with sprocket 34 mounted on shaft 35 which carries one of the rollers 10ª and the spur gear 37, and which is driven by sprocket 36 and chain 38. Spur gear 37 meshes with spur gear 58, mounted on another roller-carrying shaft 59, and drives both.

The chains 49 and 53 are both driven from a shaft 60, actuated by bevel gears 24, the drive of which has been previously traced. Sprockets 61 and 62, mounted on shaft 60 drive chains 49 and 53 respectively to a countershaft 63 mounted in the opposite end of the housing upon which sprockets 64 and 65 are mounted.

The fan 50 is mounted as shown in Fig. 3 in a conical housing behind the roller housing. It is driven through the chain 66 from a jackshaft 67, in turn driven by chain 68 and from jackshaft 69, in turn driven by bevel gears 70 from a countershaft 71, the end of which has mounted on it gear 72 cooperating with sprocket 41 (inner rim) and chain 42. The driving means of chain 42 has already been indicated.

From the rear end of the conical fan housing a duct 9ᶜ is led which branches into two portions, each of which leads to the left end (as shown in Fig. 4) of the roller pairs 10 and 10ª. The branched portions of the duct are designated by 9ᵈ and 9ᵉ, respectively.

Having now described and illustrated the preferred form of my invention, it is understood that various modifications will occur to those skilled in the art, and these modifications I claim as my own if they fairly fall within the scope of the appended claims.

I claim:—

1. In a corn stripping and husking machine, a wheeled vehicle adapted to be drawn along by traction means, power transmitting means connected to one of the wheels of the vehicle, means for stripping the ears from the stalk comprising a plurality of pairs of inclined inwardly revolving rollers and means for guiding the stalks to the said rollers, means for guiding the ears to the trough of a conveyor, means for conveying the ears up an incline, means attached to said conveyor trough comprising jagged sets of teeth and means for holding them, for stripping the husks from the ears during their passage up the incline of the conveyor, means for separating the ears and loose husks comprising a plurality of pairs of rollers and means for moving the ears across the longer dimension of said rollers and means comprising a baffle plate and a conveyor for sorting respectively the loose husks and the ears into separate storage receptacles, each of the said means requiring power, being actuated from the power-transmitting means connected to the wheel of the vehicle.

2. In a corn stripping and husking machine, a wheeled vehicle, mechanical power transmitting gear attached to one of the wheels, a corn stalk stripper, an ear husking device, means for delivering the corn from the stripper to the husking device, said husking device comprising an upwardly moving conveyor adapted to handle ears of corn and a trough for same, adjustable spring prongs having teeth thereon attached in pairs on opposite sides of the conveyor trough in such position as to adapt them to strip the husks from the ears, and means for actuating the conveyor by the progress of the vehicle.

3. In a corn stripping and husking machine, a wheeled vehicle, mechanical power transmitting gear attached to one of its wheels, a corn stalk stripper, a corn stalk husker and a corn husk separating device comprising two pairs of perforated rollers, one pair substantially below the other pair, means for delivering ears and loose husks to the rollers, means for creating a moderate suction in the rollers, means for moving the ears along the trough formed by the junction of the rollers, means for delivering the separated husks and ears to different receptacles and means for driving the members of the device requiring power, by the progress of the vehicle.

4. A corn stripping and husking machine comprising a vehicle, mechanical power transmitting gear attached to one of its wheels comprising a combined internal gear and external driving sprocket, a chain cooperating with the sprocket, said chain driving a horizontal shaft which in turn drives a conveyor and by means of another chain and sprocket driving the shaft on one of a pair of husk separating rollers, a chain and sprocket on said roll shaft driving a second similar roll shaft, a third chain and sprocket thereon driving a countershaft, a fourth chain and sprocket thereon driving a plurality of pairs of rolls comprised in a corn stripper, a pair of bevel gears cooperating with said countershaft to drive a chain parallel to each of said pairs of husk separating rolls; the internal gear of the combined integral gear and external sprocket driving a spur gear connected by a shaft to a pair of bevel gears, said bevel gears driving a shaft at right angles to the first named shaft, the second shaft having mounted thereon a sprocket and chain, said chain driving a countershaft and said countershaft directly connected to a fan.

5. A corn stripping and husking machine comprising a wheeled vehicle, mechanical power transmitting gear attached to one of its wheels, a corn stalk stripper, a corn stalk husker, corn husk separating system comprising a fan horizontally mounted adjacent to a plurality of pairs of perforated rollers, a branched duct of substantial size communicating with one end of the said pairs of rollers so as to establish means to apply a moderate suction on the rollers and means to operate the fan and rollers by the progress of the vehicle.

6. A combined corn stalk stripping and ear husking machine comprising a vehicle body, a pair of wheels thereunder, one of said wheels being provided with gear for transmitting mechanical power generated by the contact of the wheels with the ground when the vehicle is moving, a corn stalk stripper mounted hingedly on the side of the vehicle and sloping forwardly thereof, a housing mounted toward the rear of the vehicle comprising a substantially conical section housing a fan, a substantially square section housing separating means for the loose husks and ears and a flaring section joining the aforesaid conical and square sections, a partially housed conveyor movable forwardy from the bottom of the separating means housing, a bin on the rear end of the vehicle adapted to receive loose husks and to dump them at intervals, a driver's seat located at the forward end of the vehicle and a draw or traction bar also at said forward end whereby to draw the vehicle.

7. In a corn stripping and husking machine, a wheeled vehicle, means for stripping the ears from the stalk comprising a plurality of pairs of inclined inwardly revolving rollers and means for guiding the stalks to the said rollers, an inclined conveyor trough arranged to receive from said rollers, a conveyor therein, means attached to said conveyor trough comprising jagged sets of teeth for stripping the husks from the ears during their passage up the incline of the conveyor, means for separating the ears and loose husks comprising a plurality of pairs of rollers, means for moving the ears across the longer dimension of said rollers and means comprising a baffle plate and a conveyor for sorting the loose husks and the ears.

8. In a stripping and husking machine, a wheeled vehicle, a corn stalk stripper arranged in an inclined position substantially at the side of the vehicle parallel to the direction of motion of the vehicle, said stripper being hingedly mounted to an upper part of the vehicle and comprising a wheeled ground travelling fore-foot whereby said stripper will be permitted free up and down movement to accommodate inequalities in a ground surface, means to deliver stripped material from the stripper, a sloping apron adjoining said rollers adapted to receive and guide ears of corn falling from the rollers and means for operating the rollers.

9. In a corn stripping and husking machine, a wheeled vehicle, means for stripping the ears from the stalk comprising a plurality of pairs of inclined inwardly revolving rollers and means for guiding the stalks to said rollers, an inclined conveyor trough arranged to receive from said rollers, a conveyor therein, means attached to said conveyor trough comprising jagged sets of teeth for stripping the husks from the ears during their passage up the incline of the conveyor.

10. In a corn stripping and husking machine, a corn stripper, a corn stalk husker and a corn husk separating device comprising two pairs of perforated rollers, means for delivering ears and loose husks to the rollers, means for creating a moderate suction in the rollers, means for moving the ears along the trough formed by the junction of the rollers, and means for separating the husks from the rollers.

HARRY V. SHULER.